US012792311B2

(12) United States Patent
Bastien

(10) Patent No.: US 12,792,311 B2
(45) Date of Patent: Nov. 10, 2026

(54) PROVIDING TIMING-INDEPENDENCE FOR SOFTWARE

(71) Applicant: Woven by Toyota, Inc., Tokyo (JP)

(72) Inventor: Jean-François Bastien, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 227 days.

(21) Appl. No.: 18/450,361

(22) Filed: Aug. 15, 2023

(65) Prior Publication Data

US 2025/0060943 A1 Feb. 20, 2025

(51) Int. Cl.

| | |
|---|---|
| ***G06F 9/44*** | (2018.01) |
| ***G06F 8/30*** | (2018.01) |
| ***G06F 8/71*** | (2018.01) |
| ***G06F 9/445*** | (2018.01) |
| ***G06F 9/45*** | (2006.01) |
| ***G06F 9/455*** | (2018.01) |

(52) U.S. Cl.

CPC . *G06F 8/30* (2013.01); *G06F 8/71* (2013.01)

(58) Field of Classification Search

CPC ................. G06F 8/20; G06F 8/30; G06F 8/71

See application file for complete search history.

(56) References Cited

U.S. PATENT DOCUMENTS

| | | | | |
|---|---|---|---|---|
| 5,937,184 | A | 8/1999 | Rao | |
| 9,892,024 | B2 * | 2/2018 | Cerny | G06F 11/3668 |
| 10,564,987 | B1 * | 2/2020 | Lépine | G06F 9/44505 |
| 10,908,884 | B2 * | 2/2021 | Herr | G06F 8/41 |
| 11,868,479 | B2 * | 1/2024 | Lysecky | G06F 21/566 |
| 12,001,828 | B2 * | 6/2024 | Li | G06F 9/45558 |
| 12,430,236 | B2 * | 9/2025 | Muehlenstaedt | G06F 11/368 |
| 2007/0294673 | A1 | 12/2007 | Guerrera et al. | |
| 2015/0143332 | A1 | 5/2015 | Thomas et al. | |
| 2021/0019121 | A1 * | 1/2021 | Champagne | G06F 8/41 |

(Continued)

FOREIGN PATENT DOCUMENTS

| | | | | | |
|---|---|---|---|---|---|
| CN | 109189461 | A * | 1/2019 | G06F 8/63 |
| EP | 2983084 | A1 * | 2/2016 | G06F 11/3616 |

OTHER PUBLICATIONS

Camila Silva Cavalcante Lima, Functional FMECA Method Applied to Autonomous Underwater Vehicle Development, 2017, pp. 1-8. https://ieeexplore.ieee.org/stamp/stamp.jsp?tp=&arnumber=8232209 (Year: 2017).*

(Continued)

*Primary Examiner* — Mongbao Nguyen

(74) *Attorney, Agent, or Firm* — HAUPTMAN HAM, LLP

(57) ABSTRACT

Timing-independence is provided for software. Variance is added to software such as non-determinism, randomization, and the like. A distribution of unspecified modalities associated with the software is identified. Unspecified modalities include modalities in a critical path, modalities outside of design timing constraints of the software, modalities at the edge of a timing envelope, and the like. At least part of the software is modified to eliminate the unspecified modalities, such as implementing modifications to prevent over-designing of implemented hardware and overfitting of software into the implemented hardware, optimizing execution of tasks of the software, rearranging an order of execution of non-dependent tasks not in the critical path, and the like.

20 Claims, 8 Drawing Sheets

(56) References Cited

U.S. PATENT DOCUMENTS

| | | | | |
|---|---|---|---|---|
| 2021/0334630 | A1* | 10/2021 | Lambert | G05D 1/00 |
| 2022/0035927 | A1* | 2/2022 | Lysecky | G06F 21/566 |
| 2022/0083181 | A1* | 3/2022 | Grigore | G06V 20/00 |
| 2023/0176829 | A1* | 6/2023 | Rahmani | G06F 40/40 717/110 |
| 2024/0036835 | A1* | 2/2024 | Goyal | G06F 3/0482 |
| 2024/0272943 | A1* | 8/2024 | Tadkase | G06F 9/485 |
| 2024/0340302 | A1* | 10/2024 | Wang | G06N 20/00 |
| 2024/0370233 | A1* | 11/2024 | Bérard | G06F 9/4806 |

OTHER PUBLICATIONS

English translation, Yang et al. (CN 109189461 A), 2019, pp. 1-15. (Year: 2019).*

Kris Luyten, Runtime transformations for modal independent user interface migration, 2003, pp. 1-5. https://www.sciencedirect.com/science/article/abs/pii/S0953543803000122 (Year: 2003).*

Ahmed Abdallah, Hardware/Software Codesign of Aerospace and Automative Systems, 2009, pp. 1-19. https://ieeexplore.ieee.org/stamp/stamp.jsp?tp=&arnumber=5440056 (Year: 2009).*

Saurabh Bagchi, Vision Paper: Grand Challenges in Resilience: Autonomous System Resilience through Design and Runtime Measures, 2020, pp. 1-15. https://arxiv.org/pdf/1912.11598 (Year: 2020).*

Miguel Alcon, Timing of Autonomous Driving Software: Problem Analysis and Prospects for Future Solutions, 2020, pp. 1-14. https://ieeexplore.ieee.org/stamp/stamp.jsp?tp=&arnumber=9113112 (Year: 2020).*

* cited by examiner

PROVIDING TIMING-INDEPENDENCE FOR SOFTWARE

TECHNICAL FIELD

This description relates to providing timing-independence for software, and method of using the same.

BACKGROUND

Software has historically been executed in circumstances that minimize sources of variation in terms of execution time. Minimizing the sources of variation makes it easier to gain confidence in the entire system. For example, bounding execution time is a common requirement (for example, a braking system must break within a certain number of milliseconds). Also, variation in execution time means that multiple systems can interleave their interactions in complex manners, making it difficult to fully predict the combinatorial executions that are able to be observed and creating a bigger state-space to analyze for correctness, and causing more potential failure paths to validate. However, this approach means that the software is difficult to change (any straw can break the camel's back), and is tied to the hardware (because timing is in large parts dictated by specific hardware).

Vehicles are starting to use more non-real-time hardware and operating systems to meet some criteria. Therefore, the traditional approach to timing prevents reuse and evolution of software, and is less and less realistic.

Having software separated from hardware is still desirable, as well as having software meet quality goals. Thus, it is still useful to understand the impact of timing on varying levels of software. This need must be balanced with other criteria such as portability, reuse, hardware-independence, modifiability of software, etc.

SUMMARY

In at least embodiment, a method for providing timing-independence for software includes adding variance to software, identifying distribution of unspecified modalities associated with the software, and modifying at least part of the software to eliminate the unspecified modalities.

In at least one embodiment, a, includes a memory storing computer-readable instructions, and a processor connected to the memory, wherein the processor is configured to execute the computer-readable instructions to add variance to software, identify distribution of unspecified modalities associated with the software, and modify at least part of the software to eliminate the unspecified modalities.

In at least one embodiment, a non-transitory computer-readable media having computer-readable instructions stored thereon, which when executed by a processor causes the processor to perform operations for adding variance to software, identifying distribution of unspecified modalities associated with the software, and modifying at least part of the software to eliminate the unspecified modalities.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
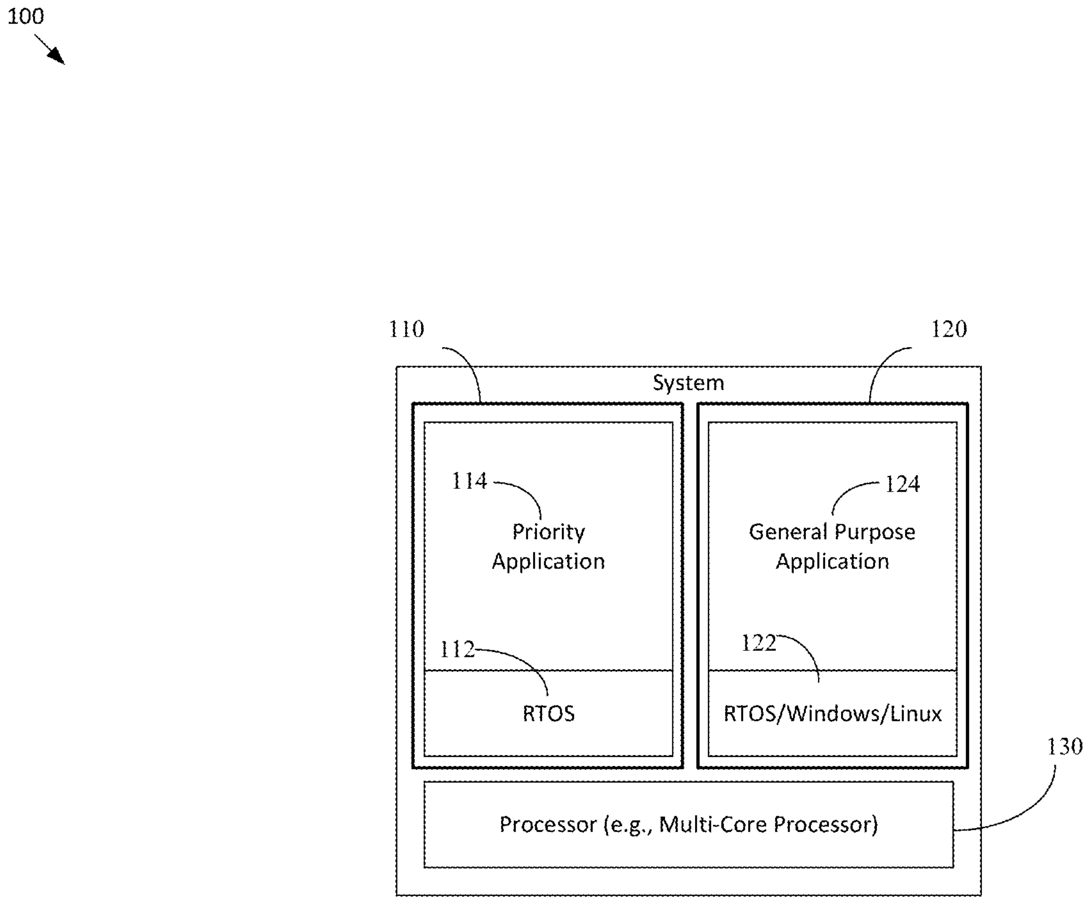
FIG. 1 illustrates a system that implements safety-critical applications and general purpose applications.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

In at least one embodiment, a method for providing timing-independence for software includes adding variance to software, identifying distribution of unspecified modalities associated with the software, and modifying at least part of the software to eliminate the unspecified modalities.

Embodiments described herein provide method that provides one or more advantages. For example, circumstances are listed along with manners with which software is able to be made timing-independent to a certain degree, while still meeting the goals that were met with timing dependence.

A system often runs multiple modal software. The software is executed multiple times and a plot of time verses a frequency of the number of events is captured. For example, 100 milliseconds is provided in an intended design of the software to perform some action. The actions are repeated every 100 milliseconds. Thus, the software is effectively performing the same operation back-to-back.

One issue with software is brittleness, where any small change in software affects timing by making a critical path overrun. The critical and non-critical path is able to be automatically identified through various tools, for example, such Place & Route. Identifying these paths enables automatically scheduling around critical path, or at least loosening timing requirements for non-critical-path software (up until non-critical-path becomes critical). This aspect loosens the rules around timing criticality, where only the actual timing critical software is considered, and automation supports the goals.

Another issue is combinatorial complexity that prevents timing from varying attempts to only ever expose one possible execution. But modern superscalar hardware inherently executes through speculation, compounded by modern operating systems, which means that having a single timing is usually futile. Therefore, the fact that timing will change is embraced, and this eventuality is thoroughly tested. One way to do this is to simply add more variance in timing on purpose, either in testing or even in production execution.

FIG. 1 illustrates a system 100 that implements priority applications and general purpose applications.

In FIG. 1, different partitions 110, 120 are configured to isolate various application domains, i.e., merging mixed-critical applications, and make use of the hardware resources as efficiently as possible. A Real-Time Operating System (RTOS) 112 is able to be used to call Priority Applications 114. General Purpose Applications 124 are able to be perform using an operating system 122 such as RTOS or more general operating systems such as Windows® Operating System or the Linux® Operating System. Separate processors or a Multi-Core Processor 130 is able to be used to run the applications 112, 122. Thus, each partition 110, 120 has its OS and application domain, e.g., perception, which is placed on top of the OS. Different timing constraints with respect to the tasks, OS schedulers, and mapping constraints (i.e., assigning tasks and schedulers to a specific core) are defined, visualized, checked, and finally validated.

An application layer is generally a complex software layer that executes a set function or responds to a set of inputs. The application programs 114, 124 are generally called through the operating system 112, 122, such as RTOS, that itself is designed to guarantee latency and provide deterministic operation. The RTOS 112 and the Priority Application 114 are usually interfaced to a hardware driver library that is constructed to a priority design standard. A driver layer assures latency and determinism through the construction of Application Programming Interfaces (APIs) that confine the functionality of application program calls. The design of the APIs, using priority constraints, sets the foundation for higher level software and serves as a system design constraint set to ensure priority operation.

Figure 2:
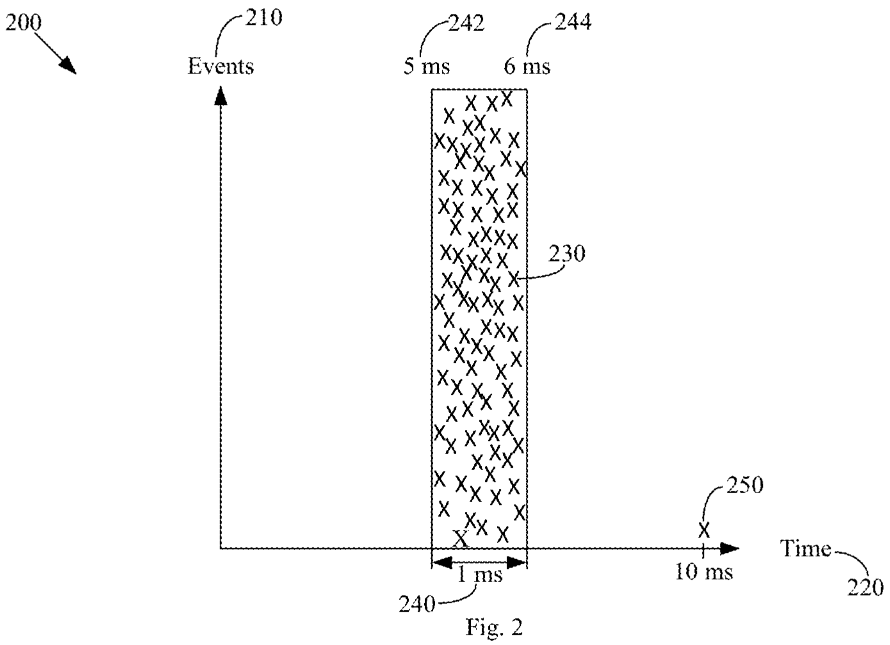
FIG. 2 shows the timing for performing an operation according to at least one embodiment.

FIG. 2 shows the timing for performing an operation 200 according to at least one embodiment.

In FIG. 2, events 210 are plotted against time 220 according to at least one embodiment. As the operation is performed, events 230 are captured. At first glance, events seem to be distributed at random times. However, in response to sampling the software, events 230 are clustered approximately around a given time. In FIG. 2, the events 230 are distributed within a predetermined time bound 240 of, for example, one millisecond (ms). The time bound 240 for the events 230 in FIG. 2 are clustered in a 1 ms window 240 from 5 ms 242 to 6 ms 244. An event, however, is able to occur outside the cluster, e.g., event 250 at 10 ms.

In operation, a processor will employ, for example, a context switch during the one millisecond time bound. An event starts and the operating system has the context switch run something else and then the process returns to run the operations. The context switch is thus able to consume a relatively large amount of time, e.g., the total time is able to take 10 milliseconds. In priority systems, an attempt is made to eliminate delays and outliers, such as event 250 at 10 ms. For example, the priority software is able to involve a self-driving vehicle, a robot, a medical instrument, or the like, wherein problems occur due to not being able to predict whether the event is going to take 1 millisecond or 10 milliseconds. For priority software, this unpredictable delay is able to cause serious harm or injury to property or to people, e.g., a car switches from self-driving mode to manual mode and the driver is not prepared, a robot performs in a manner that kills or injures someone, etc.

Priority systems are upgraded to prevent the reliability issue caused by the delay. In contrast, for a mobile phone or laptop computer, these situations happen all the time. For example, in response to a user scrolling in a browser, the scrolling process sometimes hangs for a period of time before continuing. The user is able to observe this phenomenon, but continues to scroll. However, for priority applications these types of glitches cannot occur so that the above described issues, such as causing harm or injury, are avoided.

Often software is designed to operate as quickly as possible. However, with priority software the goal is reliability, e.g., the task is to consistently complete within a given time frame 240, e.g., 1 millisecond, to prevent adverse impacts to safety or operation. Further, in actuality there are a variety of tasks that execute back-to-back and concurrently.

Figure 3:
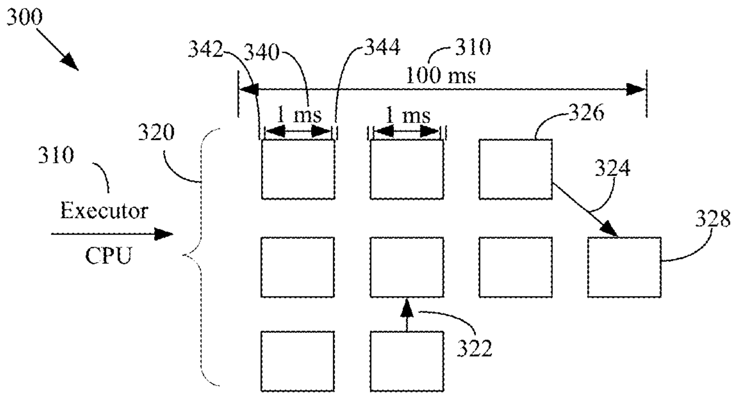
FIG. 3 illustrates multiple tasks to be completed by an executor according to at least one embodiment.

FIG. 3 illustrates multiple tasks to be completed by an executor 300 according to at least one embodiment.

In FIG. 3, executors schedule the tasks or operations. Completion of a task is often referred to as an event. Executors 310, such as a CPU or multiple cores in a multicore processor, schedule tasks 320 back-to-back. Sometimes there are dependencies 322, 324 between the tasks, and one task 326 often generates data that is used by a subsequent task 328. This creates a dependency order, where the time bound for the execution of the tasks is a predetermined amount of time 330, e.g., the tasks is to execute in 100 milliseconds (ms) and no more. The 1 millisecond bound 340 for a task is able to include a start error bound 342 and an end error bound 344 that defines how long a task can start and end, and the complete execution of all of the tasks are to complete within the 100 millisecond time bound 340.

Thus, a cushion or slack is often built into the execution of the tasks, wherein there are time bounds not just on the whole 100 milliseconds 340, but on the individual tasks 320 and there are dependencies 322, 324 between the tasks. For example, a first task 326 is to be executed before a second task 328 is able to start. Thus, the executor 310 schedules the tasks 320, for example, in a Real-Time Operating System (RTOS), in such a way that the tasks are executed within the 100 millisecond time frame 330. The variance of 1 millisecond 340 is represented between a start time and an end time. The start time and the end time bracket the amount of time for a modality, e.g., 1 ms 340. The 1 millisecond time bound 240, 340 as shown with respect to FIG. 2, occurs, for example, between 5 milliseconds 242 and 6 milliseconds 244.

Figure 4:
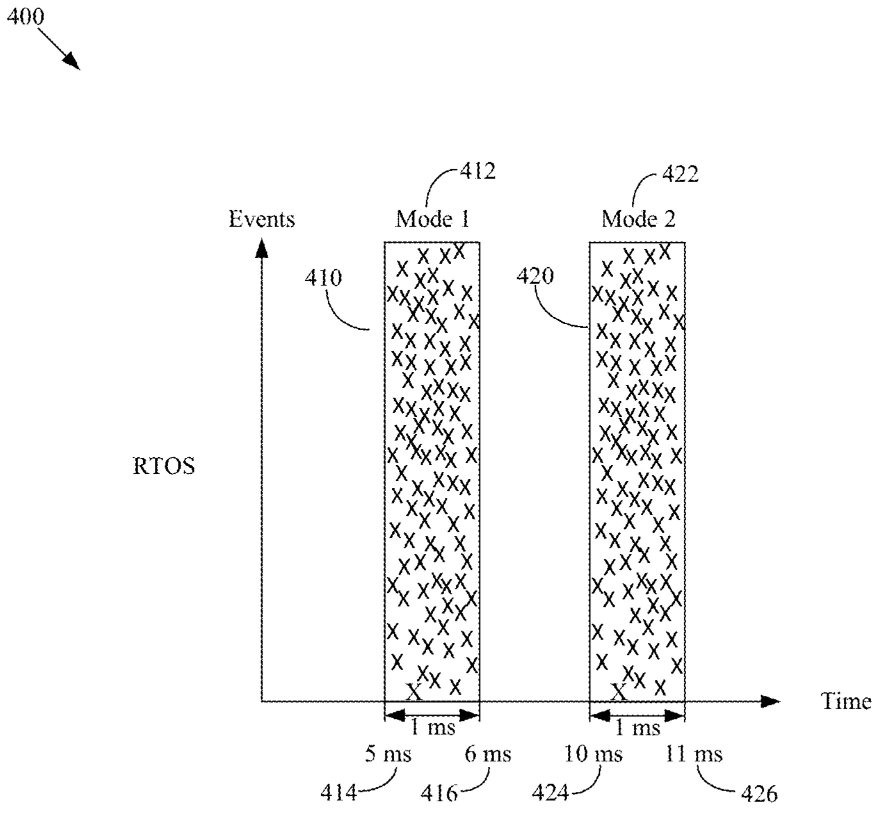
FIG. 4 illustrates two modalities according to at least one embodiment.

FIG. 4 illustrates two modalities 400 according to at least one embodiment.

In FIG. 4, a first group of events 410 are clustered in Time Bound 1 of 1 ms (Mode 1 412) from 5 ms 414 to 6 ms 416. A second group of events 420 are clustered in Time Bound 2 of 1 ms (Mode 2 422) from 10 ms 424 to 11 ms 426. However, those skilled in the art recognize that other modalities are able to occur. Thus, in the real world there is not always a single modality and there are often multi-modalities that exist. Thus, Mode 1 412 occurs within 1 millisecond from 5 milliseconds 414 to 6 milliseconds 416 and Mode 2 422 occurs in milliseconds from 10 milliseconds 424 to 11 milliseconds 426. However, there is uncertainty regarding which mode will occur. The two modes 412, 422 are able to occur as the software is running back-to-back, or happens when features are added somewhere in the software, and not necessarily in the software that is executing. Different modalities are able to happen in response to software being compiled once and shipped to a vehicle, where only one mode has been refined. However, in response to compiling other parts of the software and re-run, Mode 2 422 is able to be seen.

Accordingly, as described below, variants or non-determinism is added to software to identify timing issues or modalities that were not known about are forced to occur. The forcing of modalities increases the likelihood of identifying issues during development testing so safety is increased, even though the statistical likelihood of the modalities happening during production or after the software is deployed is low. The dynamic application of randomness by purposely inserting non-determinism is used to try to break the software to identify such issues.

Figure 5:
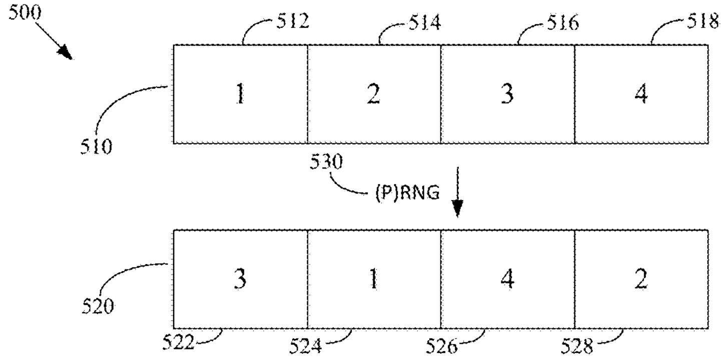
FIG. 5 illustrates memory alignment randomization according to at least one embodiment.

FIG. 5 illustrates memory alignment randomization 500 according to at least one embodiment.

In FIG. 5, the memory layout of the software is randomized so that from one execution to another, the order of execution of the software changes so that a modality appears. However, memory allocation in software involves pre-allocation of a lot of memory or scratch buffers that are allocated linearly.

FIG. 5 shows memory 510 with 4 entries being allocated in response to a specific operation, e.g., Entry 1 512, Entry 2 514, Entry 3 516, Entry 4 518. In response to a fifth entry being accessed, the software crashes. With software, Entry 1 512, then Entry 2 514, then Entry 3 516, and then Entry 4 518 are allocated sequentially. This makes the allocation very predictable. Any kind of cache effect or in how the cache is working or interacts shows up in a predictable manner in these circumstances.

Purposeful non-determinism is able to be added in parts of software which cause timing to change in hardware. One example is Address Space Layout Randomization: this security measure tends to expose modalities in software timing because caches in hardware (data cache, TLB, branch prediction, etc.) tend to vary if there is “false sharing” or “true sharing”, which in turn depends on how ASLR chose to align (virtual or physical) addresses. True sharing of data occurs where two cores try to access and modify the same word, resulting in continuous invalidation of the cache line in the other core. False sharing of data” occurs where two cores try to access and modify the two different words within the same cache line, resulting in continuous invalidation of the cache line in the other core.

Thus, according to at least one embodiment, the allocation order of memory 520 is randomized, both for testing and production, so that instead of allocating Entry 1 512, Entry 2 514, Entry 3 516, Entry 4 518 in sequence as shown in memory 510, a random number generator or pseudo random number generator 530 is used and variance is provided to the order in which allocation occurs to force the observance of modality. For example, due to randomization, memory 520 is allocated with the order being Entry 3 522, Entry 1 524, Entry 4 526, and then Entry 2 528.

Different modes result from a change to the page alignment, e.g., where the executable is located inside of memory. Thus, none of the code has changed, but where the code is located inside memory results in a mode change. The reason for a mode change is that changes occur because of the way cache works in the hardware. The mode change is not just due to recompilation, but the change is sometimes due to execution on different hardware.

Therefore, using ASLR and using more of it will expose the modal behaviors by forcing the false/true sharing. ASLR is able to be generalized to other places that can be randomized or made non-deterministic, to forcibly expose areas of modal behavior. Another example would be when allocating the hash algorithm or constants for an associative container.

Software is also able to be executed on two Advanced Reduced Instruction Set Computer (RISC) Machine (ARM) CPUs, where the ARM CPUs are of different versions. The same time bound is able to be used, but on different hardware the software executes on different modes.

With vehicles, manufacturers try to have a single modes and in response to having multiple mode, the manufacturers over budget. For example, the manufacturers build the two modes and calculate a worst case behavior for the two modes. However, the timing is overestimated which causes over budgeting. Software components have multiple worst cases that stack, which leads to even further overestimates.

To be able to update software over time, knowledge of the modes that occur and how that software executes is used. To use that software in different versions of hardware, knowledge of the different modes is useful, but the time that multiple modes occur is able to change.

Typically, with priority software, such as self-driving software, robots, medical equipment, nuclear power plants, airplanes, and the like, software is developed and then the software is tested specifically for the purpose that the software is intended and the circumstances that the software is going to experience. The industry’s best practice today for safety is to write the software and then prevent anything in the critical software from changing.

In contrast, according to at least one embodiment, change is built into the entire development process, for example, as described with randomization of memory allocation as described with reference to FIG. 5. Mode shifts are caused to occur from one place to another. Any tiny change is able to be the straw that breaks the camel’s back where the software does not meet the timing constraints, e.g., the execution timing does not fit within the 100 milliseconds bound. A goal according to at least one embodiment is to increase the quality of software, reduce cost, and enables software to ship faster, which involves in part re-using software over time and updating the software over time. In order to update the software over time, aspects of the software cannot be bolted to the ground to prevent the software from changing. By embracing the fact that changes are going to be made, the fact that there is multimodal software that exists also has to be embraced. So the multi-modality problem is to be solved early, otherwise any change to the software is a giant disruptor because such change causes a timing change or causes unpredictable effects that have not been tested. Thus, the multiple modality is exercised early on in the development process.

Accordingly, as software is developed, variants are forced to occur so the software is built in a resilient way so bands that were not known about are forced to occur, which causes modifications to be developed to address previously unknown issues. Such variance often originates form from small changes. Variants are forced into the software so the software encounters circumstances that are not the ones the software normally encounters.

Building in variance into the software is similar to a concept that is referred to as TAKT time, which involves aligning the manufacturing process with customer demand. TAKT time is a metric that represents a calculation of the time available production time divided by customer demand. For example, if a factory operates 480 minutes per day and customers demand 240 manufactured products per day. TAKT time is two minutes. Similarly, if customers want two new products per month, TAKT time is two weeks. The purpose is to precisely match production with demand. There is also the concept called Chaos Monkey, which is a resiliency tool that helps applications tolerate random instance failures. A production plot is pulled periodically to see what happens to prevent the production process from breaking. Variance or failure is injected into the production environment to be able to be failure resistance. According to at least one embodiment, variants are built into software development process as a testing process of the timing of software. Events that happen like one 0.0001% of the time is caused to happen 1% of the time so such events cannot be avoided.

Figure 6:
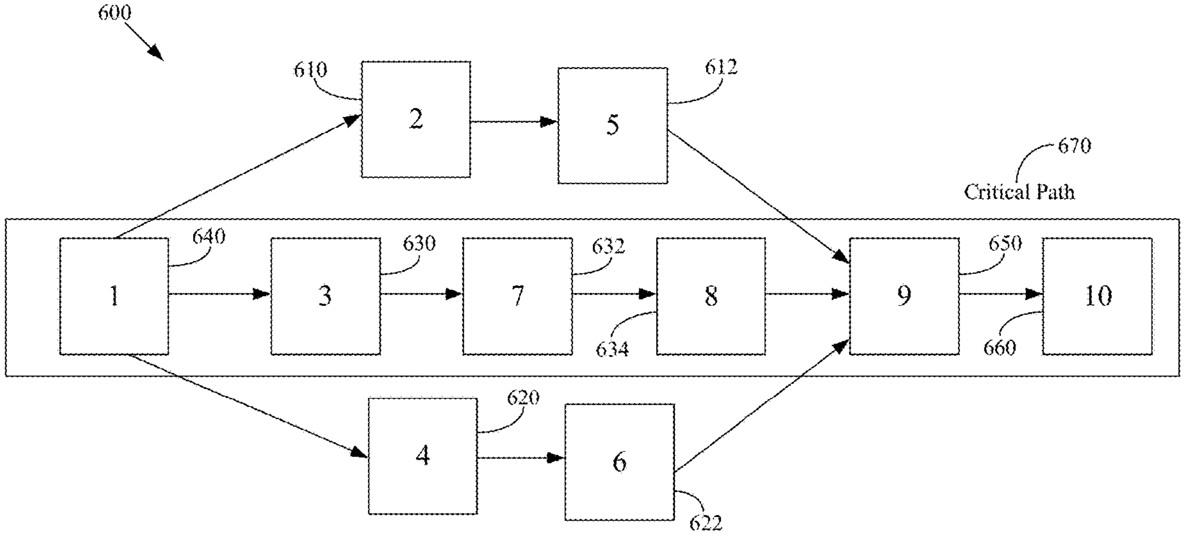
FIG. 6 illustrates a critical path for events having dependencies according to at least one embodiment.

FIG. 6 illustrates a critical path 600 for events having dependencies according to at least one embodiment.

In FIG. 6, dependent tasks/events 610, 612, dependent tasks/events 620, 622, and dependent tasks/events 630, 632, 634 are able to be identified and the execution of the tasks are able to be rearranged. The execution order of the tasks/events are able to be swapped dynamically upon each execution. By swapping the execution order, the non-critical effects are exposed.

The critical path is able to be identified and the critical path is prioritized and the execution of the order of the other tasks shift and change. The re-ordering the task is able to be changed statically, just one time, or is able to be changed dynamically. The critical path is the most important path, i.e., the path that takes the longest to complete.

In FIG. 6, Event 1 640 occurs first. Then, Event 2 610, Event 4 620, and Event 3 630 are scheduled after Event 1 640. Event 5 612 being dependent on Event 2 610 is scheduled after Event 2 610, and Event 6 622 being dependent on Event 4 620 is scheduled after Event 4 620. Event 7 632 being dependent on Event 3 630 is scheduled after Event 3 630, and Event 8 634 being dependent on Event 7 632 is scheduled after Event 7 632. Event 9 650 is scheduled after Event 8 634. Event 9 650 is also scheduled after Event 5 612 and Event 6 622. Then, Event 10 660 completes after Event 9 650. There are a variety of places in which variance is able to be added. Not all of the tasks have dependencies between each other. The non-dependent task happen to be scheduled back-to-back for convenience. Eventually, the tasks feed their output into the other dependent tasks.

In FIG. 6, the critical path is path 670. As illustrated in FIG. 6, the critical path 670 includes Events 1 640, Event 3 630, Event 7 632, Event 8 634, Event 9 650, and Event 10 660. The tasks in the critical path 670 are not able to be reordered because the critical path 670 is the path with the longest execution time. However, the order of the other tasks are able to be rearranged. For example, Event 5 612 is able to be schedule with Event 7 or Event 8 634. Similarly, Event 2 610 is able to be scheduled with Event 3 630 or Event 7 632. Likewise, Event 6 622 is able to be schedule with Event 7 or Event 8 634, and Event 4 620 is able to be scheduled with Event 3 630 or Event 7 632. The reordering of the execution of those tasks affects the variance of the critical path.

As the tasks are executed linearly, the other tasks are rotated around the critical path 670, or change execution in other CPUs. For a system having multiple executors, the order of execution is able to be changed. This forces cache effects or exposes the modality of execution.

The forcing of modalities increases the likelihood of identifying issues during development testing so safety is increased, even though the statistical likelihood of the modalities happening during production or after the software is deployed is low. The application of randomness to reorder events is accomplished purposely inserting non-determinism to dynamically try to constantly break the software to identify issues. As mentioned, there is a 0.0001% that an issue will occur and by adding non-determinism the issue is forced to occur more often than 0.0001%, e.g., 0.01%, so that the issue is able to be addressed before production and before the software is deployed.

Another aspect is that software reuse is enabled, e.g., the software is to be able to evolve over time. For example, a current version of the software does not have an issue. However, variance is built into the execution of the software so that once software changes are made, the likely modalities are able to be explored. Non-deterministic randomness is injected during testing and production in order to account for and manage future change as well as optimize for the allocation of hardware.

The injection of non-determinism provides a tolerance beyond what is actually specified, e.g., the software is not over-provisioned. Once software is changed or an upgrade is implemented, the software is tested by injecting the non-determinism to ensure issues do not occur. The injection of non-determinism not only prevents over-designing the hardware, but also prevents overfitting the current software into the current hardware.

For example, the hardware will change as new vehicles are created and the software will be reused. The software will be created for the new hardware. If the new software is held constant, e.g., no changes are allowed, as the new software is used with the new hardware, the new hardware is overfitted to the software. Instead, the injection of non-determinism provides a broader view of what these modalities look like and safety is ensured through careful planning and developing a thorough understanding about the hardware and the software.

Figure 7:
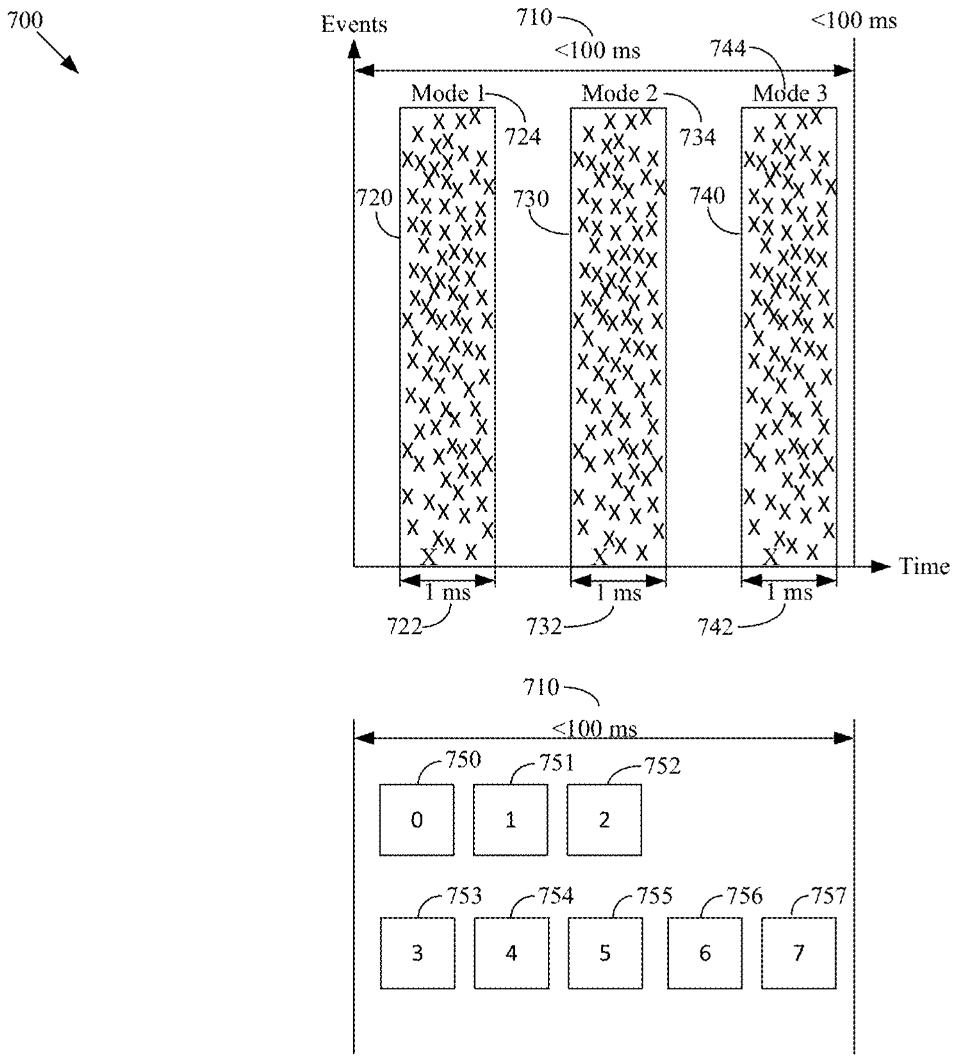
FIG. 7 illustrates three modalities according to at least one embodiment.

FIG. 7 illustrates three modalities 700 according to at least one embodiment.

In FIG. 7, the timing constraint is 100 millisecond 710. A first group of events 720 are clustered in Time Bound 1 of 1 ms 722 (Mode 1 724). A second group of events 730 are clustered in Time Bound 2 of 1 ms 732 (Mode 2 734). A third group of events 740 are clustered in Time Bound 3 of 1 ms 742 (Mode 3 744).

Subcomponent 0 750, subcomponent 1 751, subcomponent 2 752, subcomponent 3 753, subcomponent 4 755, subcomponent 5 755, subcomponent 6 756, and subcomponent 7 757 are shown below the plot. Instead of measuring subcomponents 0-7 750-757 individually, the complete execution timing for subcomponents 0-7 750-757 is measured. The order of execution is varied and the modal distribution is captured.

As the events are randomized and multiple modes are exposed and stacked up. The mode on the right, Mode 3 744, is fairly uncommon in regular execution, but the randomization has exposed Mode 3 744. The software developer is able to attempt to avoid Mode 3 744 and so the software developer inspects the software to determine why Mode 3 744 happened, e.g., which of the subcomponents 0-7 750-757 was part of the critical path. The distribution plot showing three modalities 700 lets the software developer know where time is to be spent to optimize the execution, to reduce the variance, etc. so Mode 3 744 is able to be shifted to the left so the variance is not too close to the 100 millisecond time constraint 710 to ensure safety.

According to at least one embodiment, the software and hardware are decoupled. Thus, the hardware is able to be the floating point, the software is able to be the floating point, or both. Because of the nature of the system, one never breaks the other. The software will thus not be put in production in response to the software breaking, or the software is rolled back very quickly because the testing is able to uncover these significant edge cases. Eliminating unspecified modalities, e.g., modalities outside or too close to the design timing constraints, e.g., Mode 3 744, addresses the problem of planning and mitigating for true safety even the these systems are becoming increasingly complex.

Through the identification of the edge cases, e.g., Mode 3 744, the quality of software along with the compatibility of the software with related hardware is ensured. Both the complexity in a static model is accounted for as well as the complexity of both software and hardware in a dynamic model where both are changing. This is applicable to not only the evolution of a particular model line, but also variance within that model line in different models altogether. Insight is not required in every detail of the software and hardware in order to mitigate risk.

Randomization is able to be injected into software in several ways. Randomization is able to be injected based on the order in which events are scheduled considering dependencies as described with reference to FIG. 6. As described above, software development practice today is to prevent any variance.

Allocation order is also able to be randomized as described with to FIG. 5. Other randomization techniques include oversize allocating (allocating more than requested), code alignment, using different instructions, and the like.

For example, software instructions are generated to perform a set of tasks. Often the instructions are equivalent or at least produce the same results. So, different instructions are able to be used, e.g., with x86 systems there are similar instructions such as add, load effective address (LEA), etc. LEA executes on a different execution unit, and introduces some amount of variants in execution because LEA uses a different resource. Also, different instructions that are equivalent for a given purpose are able to be selected that produces a different result. For example, for floating point math, 16-bit floating point instructions (called F16) and versions using 32-bit floating point instructions (called F32) are able to be used.

Figure 8A:
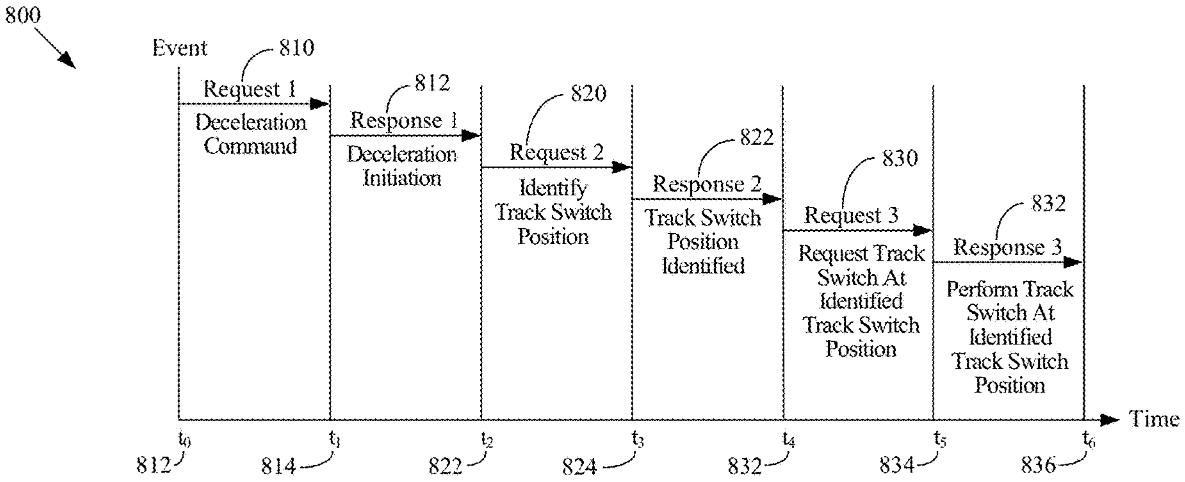
FIGS. 8*a-b* illustrate the effect of injection timing variance into API calls and responses according to at least one embodiment.
Figure 8B:
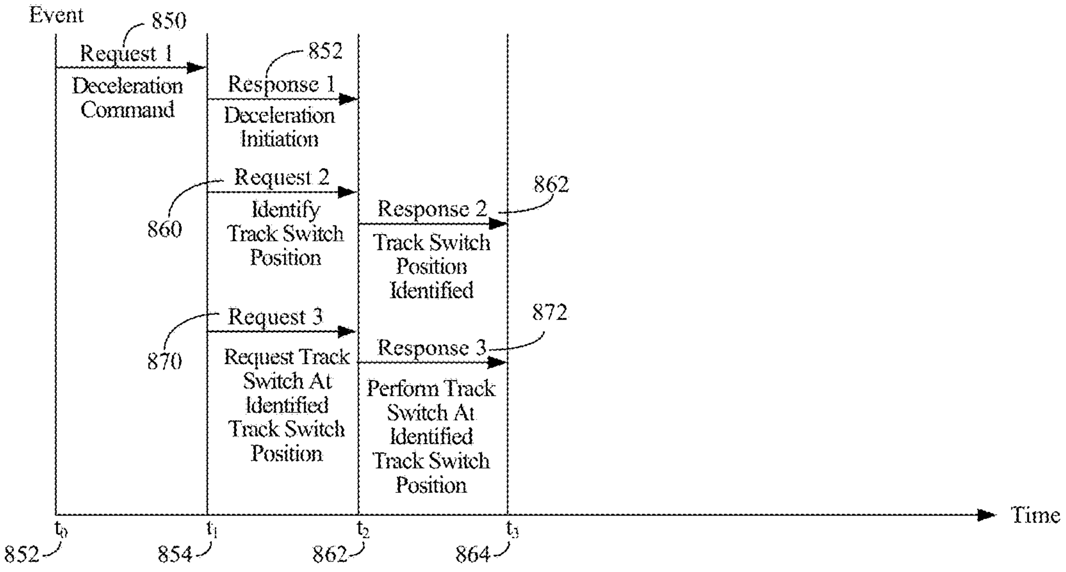

FIGS. 8*a*-*b* illustrate the effect of injection timing variance into API calls and responses 800 according to at least one embodiment.

In FIG. 8*a*, events for Requests 1-3 810, 820, 830, and events for Responses 1-3 812, 822, 832 are shown. During software testing, virtual hardware is able to simulate timing-critical failure in systems by listing all the timing APIs where race conditions are able to occur. An event represents an execution instance of a statement or statement sequence in the program. An event specifies the set of shared memory locations that are read and/or written. Events do not necessarily occur instantaneously, and in parallel programs, events sometimes are unordered. The timing of an event is specified by its start and end instants. Events e1, e2 are simultaneous if the start of e1 occurs after the start of e2 but before the end of e2 or vice versa. A trace facility helps isolate system problems by monitoring selected system events.

In FIG. 8, Request 1 810 occurring between $t_0$ 812 and $t_1$ 814 represents a request for deceleration of a vehicle, such a rail vehicle, a car, and the like. However, those skilled in the art recognize that other implementations are applicable consistent with the embodiments disclosed herein. Response 1 812 occurring between $t_1$ 814 and $t_2$ 822 represents a deceleration being applied to the vehicle.

Request 2 820 occurring between $t_2$ 822 and $t_3$ 824 represents a request for identification for a track switch deceleration of a vehicle (in this specific example, the vehicle is a rail vehicle). Response 2 822 occurring between $t_3$ 824 and $t_4$ 832 represents a position of the track switch being identified.

Request 3 830 occurring between $t_4$ 832 and $t_5$ 834 represents a request for the track switch for the vehicle to be made at the identified track switch position. Response 3 832 occurring between $t_5$ 834 and $t_6$ 836 represents the track switch for the vehicle being implemented at the identified track switch position.

In different executions of the same program on the same input, access events that constitute a race sometimes occur in different order, which sometimes results in different program behaviors (non-determinacy). For example, multiple threads sometimes access the same variable in shared memory simultaneously and at least one access modifies the variable, which sometimes results in errors.

An Application Programming Interface (API) is a set of defined rules that enable different applications to communicate with each other. For example, a memory management API is used to allocate memory, a data management API is used to access data, and a socket API provide a form of inter-process communication (IPC) and are used to send messages across a network. There are many other types of APIs.

APIs designed for real-time rendering adopt a pipeline execution model. A race condition refers to a bug that occurs due to the timing or order of execution of multiple operations. A bug is an error, flaw or fault in the design, development, or operation of computer software that causes it to produce an incorrect or unexpected result, or to behave in unintended ways. Race conditions are a fairly broad class of bugs that can present themselves in very different ways, depending on the problem space. For example, multiple threads making multiple API calls using the same resource sometimes produce different outcomes due to the timings of the APIs.

In FIG. 8*b*, fault injection for the possible interleaving between operation of the APIs involve injecting faults into the software to identify timing issues. Formal methods are able to be used to identify the parts of software where timing is relied upon, and then list all potential execution paths. This then leads to the identification of all potential failure modes and creates a test plan where all of these have to be tested (either automatically, or manually).

FIG. 8*b* shows that Request 1 850 occurs between $t_0$ 852 and $t_1$ 854 again representing a command to decelerate the vehicle. Response 1 852 occurring between $t_1$ 854 and $t_2$ 862 represents the deceleration of the vehicle being initiated.

Variance has been added so that Request 2 860, Response 2 862, Request 3 870, and Response 3 872 have been shifted in time thereby producing a race condition between Request 2 860 and Request 3 870, and between Response 2 862 and Response 3 872.

Request 2 860 now occurs between $t_1$ 854 and $t_2$ 862 and represents the request for identification for the track switch deceleration of the vehicle. Response 2 862 now occurs between $t_2$ 862 and $t_3$ 864 and represents the position of the track switch being identified.

Request 3 870 now occurs between $t_1$ 854 and $t_2$ 862 and represents the request for the track switch for the vehicle to be made at the identified track switch position. Response 3 872 now occurs between $t_2$ 862 and $t_3$ 864 and represents the track switch for the vehicle being implemented at the identified track switch position. However, Request 3 870 for the track switch at the identified track switch position to made is concurrent with Request 2 860 for identification for the track switch deceleration of the vehicle. Similarly, Response 3 872 for performing the track switch at the identified track switch position is concurrent with Response 2 862 identifying the track switch position. Thus, the track switch per Request 3 870 and Response 3 872 is not able to be made because Response 2 862 has not been completed and the identification of the track switch position is not known before the track switch operation is to be performed.

By adding these sources of non-determinism, modal behaviors are quantified, and an envelope of timing for various executions are determined. This quantification allows the discovery of the parts of software/hardware that will differ and ensure that all of these are within the system's Operational Design Domain. A thorough list of the timing issues (for example, through formal methods) also offer "timing coverage" for the system: identifying how many of the timing modalities have been executed and have been quantified. Estimates which bound the worst-case of modalities which have not been executed (non-covered modalities) are able to be identified.

Software is also able to be modified in production to identify whether real-world software ever experiences timing that does not fit the model that was developed. Any overrun can be reported and an investigation is able to be initiated to understand why the model was wrong. Further, the focus is able to not only be on unexpected overruns, but also on a distribution curve of expected runtime execution behavior. In response to runtime not fitting the expected statistical model, then the investigation is again able to be initiated. Testing is able to be performed virtually on a varying degree of fidelity with respect to the hardware. The level of fidelity of the simulation/emulation is relevant to establishing the model, and more precise virtual testing is able to be used to quantify the fidelity of less precise models. Thus, variability in timing is able to be managed and multimodal behavior exposed. As software and hardware evolves, new modalities sometimes occur. The above methodologies allows identifying when new modalities occur, and the changes in the range of possible behaviors, as well as possible new failure paths, are able to be quantified. Hypothetical hardware that exhibits other behaviors, and exposes other modalities is able to be created. Identification of unspecified modalities and the failure paths make it easier to create new hardware because the risk that timing on this new platform is a problem is reduced by making the scale of timing changes known up-front.

To further improve the above, some types of algorithms are more efficient in response to being synchronized at particular timing events. For example, direct-to-RAM networking is more efficient in response to timing being well quantified. Similarly, an operating system scheduler is able to reduce timing variability in response to the scheduler being tuned, which requires quantifying potential variability as above. These optimizations are similar to reducing interference for safety system, a.k.a. Freedom From Interference. In addition, some algorithms, such as RCU (Read Copy Update), perform better (particularly in a real-time operating system) in response to having custom quiescence points to reclaim memory as soon as possible. Having a system to quantify timing variance allows discovery of how to optimally schedule and insert quiescence points while meeting other criteria for the overall system.

Figure 9:
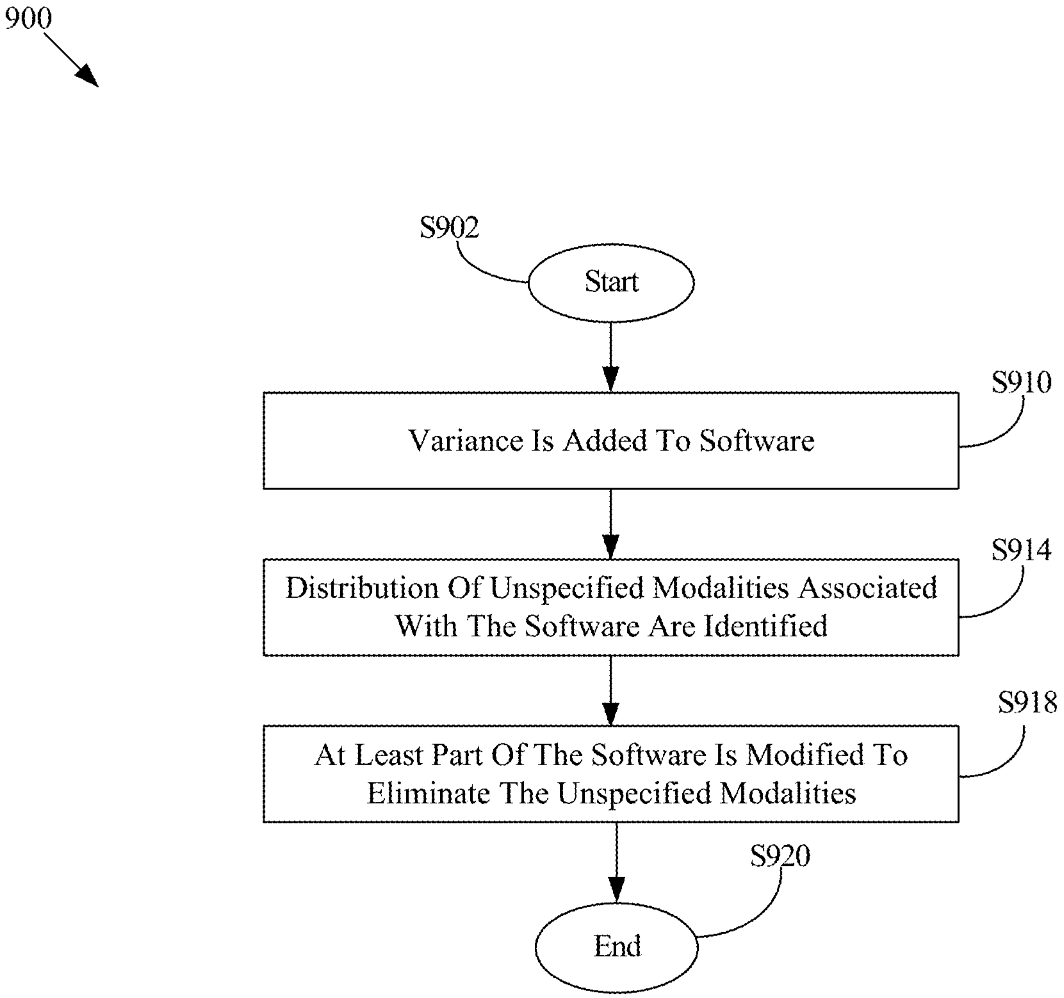
FIG. 9 is a flowchart of a method for providing timing-independence for software according to at least one embodiment.

FIG. 9 is a flowchart 900 of a method for providing timing-independence for software according to at least one embodiment.

In FIG. 9, the method starts S902 and variance is added to software S910. Referring to FIG. 4, variants or non-determinism is added to software to identify timing issues or modalities that were not known about are forced to occur. The forcing of modalities increases the likelihood of identifying issues during development testing so safety is increased, even though the statistical likelihood of the modalities happening during production or after the software is deployed is low. The dynamic application of randomness by purposely inserting non-determinism is used to try to break the software to identify such issues. Referring to FIG. 5, the memory layout of the software is randomized so that from one execution to another, the order of execution of the software changes so that a modality appears. Referring to FIG. 7, other randomization techniques include oversize allocating (allocating more than requested), code alignment, using different instructions, and the like.

Distribution of unspecified modalities associated with the software are identified S914. Referring to FIG. 7, eliminating unspecified modalities, e.g., modalities outside the design timing constraints, addresses the problem of planning and mitigating for true safety even the these systems are becoming increasingly complex. Referring to FIGS. 8*a-b*, by adding these sources of non-determinism, modal behaviors are quantified, and an envelope of timing for various executions are determined. This quantification allows the discovery of the parts of software/hardware that will differ and ensure that all of these are within the system's Operational Design Domain. Referring to FIG. 6, the critical path is able to be identified and the critical path is prioritized and the execution of the order of the other tasks shift and change. The re-ordering the task is able to be changed statically, just one time, or is able to be changed dynamically.

At least part of the software is modified to eliminate the unspecified modalities S918. Referring to FIG. 6, the injection of non-determinism provides a tolerance beyond what is actually specified, e.g., the software is not over-provisioned. Once software is changed or an upgrade is implemented, the software is tested by injecting the non-determinism to ensure issues do not occur. The injection of non-determinism not only prevents over-designing the hardware, but also prevents overfitting the current software into the current hardware. Referring to FIG. 7, the distribution plot lets the software developer know where time is to be spent to optimize the execution, to reduce the variance, etc. so Mode 3 is able to be shifted to the left so the variance is not too close to the 100 millisecond time constraint to ensure safety.

The process then terminates S920.

At least one embodiment of the method for providing timing-independence for software includes adding variance to software, identifying distribution of unspecified modalities associated with the software, and modifying at least part of the software to eliminate the unspecified modalities.

Figure 10:
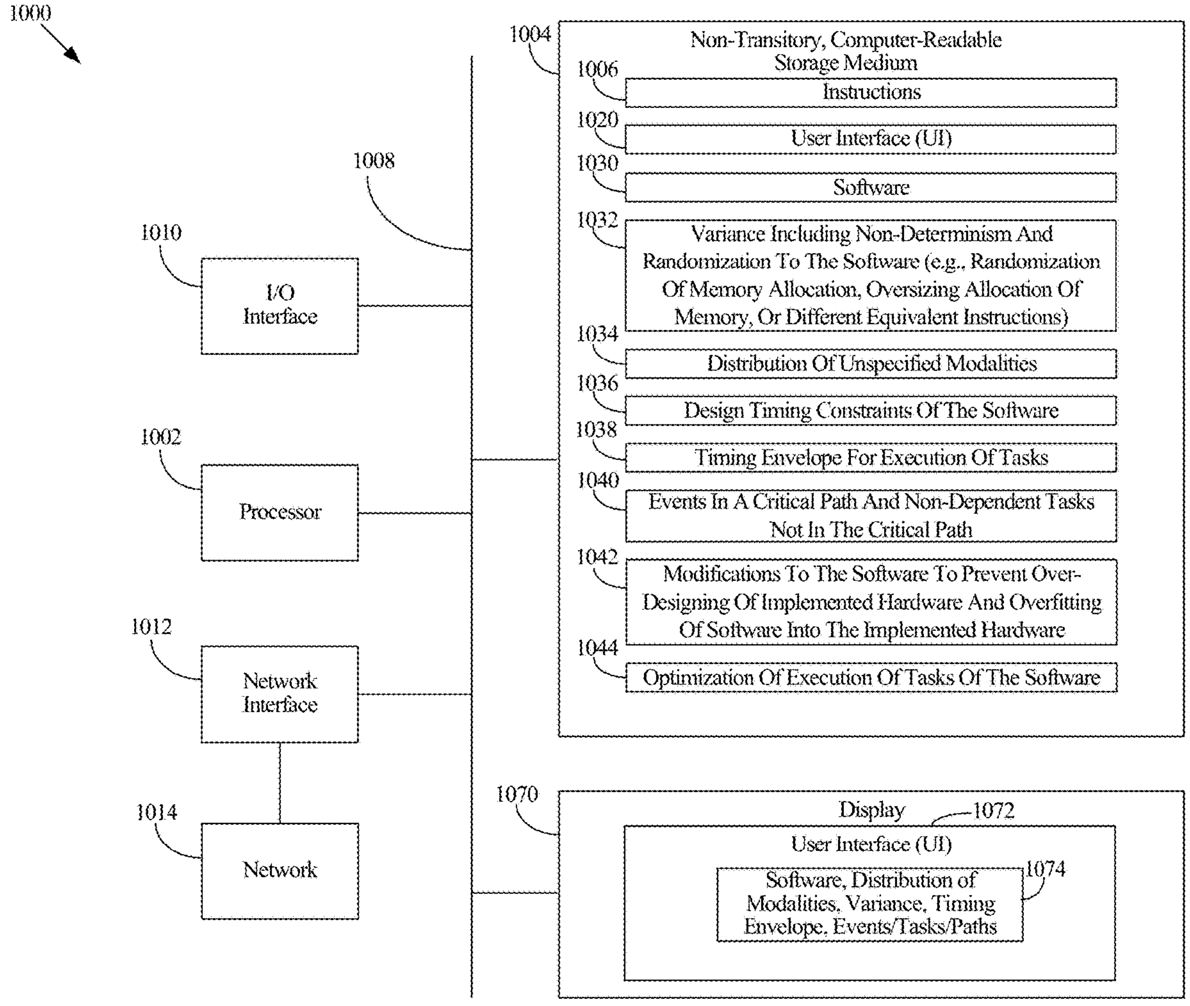
FIG. 10 is a high-level functional block diagram of a processor-based system according to at least one embodiment.

FIG. 10 is a high-level functional block diagram of a processor-based system 1000 according to at least one embodiment.

In at least one embodiment, processing circuitry 1000 provides timing-independence for software. Processing circuitry 1000 implements the addition of timing-independence for software using Processor 1002. Processing circuitry 1000 also includes a Non-Transitory, Computer-Readable Storage Medium 1004 that is used to implement timing-independence for software. Non-Transitory, Computer-Readable Storage Medium 1004, amongst other things, is encoded with, i.e., stores, Instructions 1006, i.e., computer program code, that are executed by Processor 1002 causes Processor 1002 to perform operations for providing timing-independence for software. Execution of Instructions 1006 by Processor 1002 represents (at least in part) an application which implements at least a portion of the methods described herein in accordance with one or more embodiments (hereinafter, the noted processes and/or methods).

Processor 1002 is electrically coupled to Non-Transitory, Computer-Readable Storage Medium 1004 via a Bus 1008. Processor 1002 is electrically coupled to an Input/Output (I/O) Interface 1010 by Bus 1008. A Network Interface 1012 is also electrically connected to Processor 1002 via Bus 1008. Network Interface 1012 is connected to a Network 1014, so that Processor 1002 and Non-Transitory, Computer-Readable Storage Medium 1004 connect to external elements via Network 1014. Processor 1002 is configured to execute Instructions 1006 encoded in Non-Transitory, Computer-Readable Storage Medium 1004 to cause processing circuitry 1000 to be usable for performing at least a portion of the processes and/or methods. In one or more embodiments, Processor 1002 is a Central Processing Unit (CPU), a multi-processor, a distributed processing system, an Application Specific Integrated Circuit (ASIC), and/or a suitable processing unit.

Processing circuitry 1000 includes I/O Interface 1010. I/O interface 1010 is coupled to external circuitry. In one or more embodiments, I/O Interface 1010 includes a keyboard, keypad, mouse, trackball, trackpad, touchscreen, and/or cursor direction keys for communicating information and commands to Processor 1002.

Processing circuitry 1000 also includes Network Interface 1012 coupled to Processor 1002. Network Interface 1012 allows processing circuitry 1000 to communicate with Network 1014, to which one or more other computer systems are connected. Network Interface 1012 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 1000 is configured to receive information through I/O Interface 1010.

The information received through I/O Interface 1010 includes one or more of instructions, data, design rules, libraries of cells, and/or other parameters for processing by Processor 1002. The information is transferred to Processor 1002 via Bus 1008. Processing circuitry 1000 is configured to receive information related to a User Interface (UI) through I/O Interface 1010. The information is stored in Non-Transitory, Computer-Readable Storage Medium 1004 as UI 1020.

In one or more embodiments, one or more Non-Transitory, Computer-Readable Storage Medium 1004 having stored thereon Instructions 1006 (in compressed or uncompressed form) that may be used to program a computer, processor, or other electronic device) to perform processes or methods described herein. The one or more Non-Transitory, Computer-Readable Storage Medium 1004 include one or more of an electronic storage medium, a magnetic storage medium, an optical storage medium, a quantum storage medium, or the like.

For example, the Non-Transitory, Computer-Readable Storage Medium 1004 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 1004 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 1004 stores Instructions 1006 configured to cause Processor 1002 to perform at least a portion of the processes and/or methods for providing timing-independence for software. In one or more embodiments, Non-Transitory, Computer-Readable Storage Medium 1004 also stores information, such as algorithm which facilitates performing at least a portion of the processes and/or methods for providing timing-independence for software.

Accordingly, in at least one embodiment, Processor 1002 executes Instructions 1006 stored on the one or more Non-Transitory, Computer-Readable Storage Medium 1004 to load, execute, and manipulate software under test 1030. Processor 1002 adds Variance 1032 including non-determinism and randomization to the software (e.g., randomization of memory allocation, oversizing allocation of memory, or different equivalent instructions). Processor 1002 executes Instructions 1006 stored on the one or more Non-Transitory, Computer-Readable Storage Medium 1004 to determine a distribution of the unspecified modalities 1034, e.g., modalities outside of design timing constraints of the software 1036. Processor 1002 determines a timing envelope for execution of the tasks 1038, determines events in a critical path and non-dependent tasks not in the critical path 1040. Processor 1002 is able to reorder the non-dependent tasks not in the critical path 1040. Processor 1002 implements modifications to the software 1042 to prevent over-designing of implemented hardware and overfitting of software into the implemented hardware. Processor 1002 optimizes execution of task of the software 1044. A display 1070 provides a User Interface (UI) 1072 for presenting the software, distribution of modalities, variance added to the software, the timing envelope, and events, tasks, and paths 1074.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing timing-independence for software, comprising:

purposely adding variance to software to intentionally force occurrence of unspecified modalities associated with changes in operation of the software and hardware that deviates from an operational design model;

executing the software with the purposely added variance to intentionally force the occurrence of the unspecified modalities;

presenting the unspecified modalities in a user interface on a display, wherein the presenting the unspecified modalities include presenting the changes in the operation of the software and the hardware that deviates from the operational design model;

based on the unspecified modalities presented in the user interface on the display, identifying the unspecified modalities during execution of the software;

identifying, in the user interface on the display, distribution of the unspecified modalities associated with execution of the software in response to the purposely adding the variance to intentionally force the occurrence of the unspecified modalities associated with changes in operation of the software or the hardware;

modifying the software to eliminate the unspecified modalities; and executing the modified software to determine whether the unspecified modalities have been eliminated.

2. The method of claim 1, wherein the identifying the distribution of the unspecified modalities associated with the software includes identifying the distribution of modalities outside of design timing constraints associated with the execution of the modified software.

3. The method of claim 1, wherein the purposely adding the variance to the software includes at least one of:

purposely adding non-determinism to the software to to intentionally force timing of execution of tasks by the software to change; or purposely adding randomization to the software, wherein the purposely adding the randomization to the software includes at least one of purposely adding randomization of memory allocation, oversizing allocation of the memory, or replacing instructions of the software with different equivalent instructions.

4. The method of claim 1, wherein the identifying the distribution of the unspecified modalities includes quantifying the unspecified modalities, determining a timing envelope for execution of tasks of the software, and identifying the unspecified modalities at an edge of the timing envelope.

5. The method of claim 1, wherein the identifying the distribution of the unspecified modalities includes identifying events in a critical path and rearranging an order of execution of non-dependent tasks not in the critical path.

6. The method of claim 1, wherein the modifying the software to eliminate the unspecified modalities includes modifying the software to prevent over-designing of implemented hardware and overfitting of the software into the implemented hardware.

7. The method of claim 1, wherein the modifying the software to eliminate the unspecified modalities includes optimizing execution of tasks of the software.

8. A device for providing timing-independence for software, comprising:

a memory storing computer-readable instructions; and a processor connected to the memory, wherein the processor is configured to execute the computer-readable instructions to perform operations to:

purposely adding variance to software to intentionally force occurrence of unspecified modalities associated with changes in operation of the software and hardware that deviates from an operational design model;

executing the software with the purposely added variance to intentionally force the occurrence of the unspecified modalities;

presenting the unspecified modalities in a user interface on a display, wherein the presenting the unspecified modalities include presenting the changes in the operation of the software and the hardware that deviates from the operational design model;

based on the unspecified modalities presented in the user interface on the display, identifying the unspecified modalities during execution of the software;

identifying, in the user interface on the display, distribution of the unspecified modalities associated with execution of the software in response to the purposely adding the variance to intentionally force the occurrence of the unspecified modalities associated with changes in operation of the software or the hardware;

modifying the software to eliminate the unspecified modalities; and executing the modified software to determine whether the unspecified modalities have been eliminated.

9. The device of claim 8, wherein the processor is further configured to identify the distribution of the unspecified modalities associated with the software by identifying the distribution of modalities outside of design timing constraints associated with the execution of the modified software.

10. The device of claim 8, wherein the processor is further configured to purposely add the variance to the software by performing at least one of:

purposely adding non-determinism to the software to intentionally force timing of execution of tasks by the software to change; or purposely adding randomization to the software, wherein the purposely adding the randomization to the software includes at least one of purposely adding randomization of memory allocation, oversizing allocation of the memory, or replacing instructions of the software with different equivalent instructions.

11. The device of claim 8, wherein the processor is further configured to identify the distribution of the unspecified modalities by quantifying the unspecified modalities, determining a timing envelope for execution of tasks of the software, and identifying the unspecified modalities at an edge of the timing envelope.

12. The device of claim 8, wherein the processor is further configured to identify the distribution of the unspecified modalities by identifying events in a critical path and rearranging an order of execution of non-dependent tasks not in the critical path.

13. The device of claim 8, wherein the processor is further configured to modify the software to eliminate the unspecified modalities by modifying the software to prevent over-designing of implemented hardware and overfitting of the software into the implemented hardware.

14. The device of claim 8, wherein the processor is further configured to modify the software to eliminate the unspecified modalities by optimizing execution of tasks of the software.

15. A non-transitory computer-readable media having computer-readable instructions stored thereon, which when executed by a processor causes the processor to perform operations comprising:

purposely adding variance to software to intentionally force occurrence of unspecified modalities associated with changes in operation of the software and hardware that deviates from an operational design model;

executing the software with the purposely added variance to intentionally force the occurrence of the unspecified modalities;

presenting the unspecified modalities in a user interface on a display, wherein the presenting the unspecified modalities include presenting the changes in the operation of the software and the hardware that deviates from the operational design model;

based on the unspecified modalities presented in the user interface on the display, identifying the unspecified modalities during execution of the software;

identifying, in the user interface on the display, distribution of the unspecified modalities associated with execution of the software in response to the purposely adding the variance to intentionally force the occurrence of the unspecified modalities associated with changes in operation of the software or the hardware;

modifying the software to eliminate the unspecified modalities; and executing the modified software to determine whether the unspecified modalities have been eliminated.

16. The non-transitory computer-readable media of claim 15, wherein the identifying the distribution of the unspecified modalities associated with the software includes identifying the distribution of modalities outside of design timing constraints associated with the execution of the modified software.

17. The non-transitory computer-readable media of claim 15, wherein the purposely adding the variance to the software includes at least one of:

purposely adding non-determinism to the software to to intentionally force timing of execution of tasks by the software to change; or purposely adding randomization to the software, wherein the purposely adding the randomization to the software includes at least one of purposely adding randomization of memory allocation, oversizing allocation of the memory, or replacing instructions of the software with different equivalent instructions.

18. The non-transitory computer-readable media of claim 15, wherein the identifying the distribution of the unspecified modalities includes at least one of:

quantifying the unspecified modalities, determining a timing envelope for execution of tasks of the software, and identifying the unspecified modalities at an edge of the timing envelope; or identifying events in a critical path and rearranging an order of execution of non-dependent tasks not in the critical path.

19. The non-transitory computer-readable media of claim 15, wherein the modifying the software to eliminate the unspecified modalities includes modifying the software to prevent over-designing of implemented hardware and overfitting of the software into the implemented hardware.

20. The non-transitory computer-readable media of claim 15, wherein the modifying the software to eliminate the unspecified modalities includes optimizing execution of tasks of the software.

* * * * *